Patented Sept. 24, 1940

2,215,974

UNITED STATES PATENT OFFICE

2,215,974

ETHANOLAMINE HYDROCHLORIDE SOFTENER FOR REGENERATED CELLULOSE

Franklin Traviss Peters, Wilmington, Del., assignor to E. I. du Pont de Nemours & Company, Wilmington, Del., a corporation of Delaware No Drawing. Application May 9, 1939, Serial No. 272,641

9 Claims. (Cl. 106—40)

This invention relates to cellulosic structures, especially those of pellicular nature. More particularly, it relates to a method for producing flexible and durable cellulosic pellicles by treating the same with softening agents, and the products resulting from such treatment.

In the manufacture of cellulosic pellicles of the type precipitated from aqueous alkaline cellulosic solutions, such as regenerated cellulose pellicles, including sheets or films, caps, bands, continuous tubing, artificial straw and the like, it has long been customary to incorporate into the cellulosic pellicle a softening agent in order to maintain it in a flexible condition. Such cellulosic pellicles, when free from a softening agent, are known to be quite brittle, and while a softener free pellicle may find certain uses, a softened and therefore flexible sheet or film is much more generally useful. Heretofore, as softeners for regenerated cellulose, and similar water sensitive, cellulosic pellicles, the art has applied such substances as ethylene glycol, propylene glycol, diethylene glycol, formamide, glycerol, and the like, but of these, by far the most important is glycerol which has hitherto known no equal as a softening agent of general utility for producing flexible, transparent and durable, water sensitive, cellulosic pellicles such as those of regenerated cellulose. Many attempts have been made to find a softener for water sensitive, cellulosic pellicles which will be as cheap as and which will have the generally useful softening characteristics of glycerol. After continued use of previously discovered softening agents, they were found to be deficient in some respect and therefore could not be generally substituted for glycerol as a softening agent for regenerated cellulose and like water sensitive, cellulosic pellicles.

Glycerol is obtained commercially primarily as a by-product from the soap industry. As a by-product, the quantity may be limited and hence glycerol is subject to market fluctuations of supply as well as price. Glycerol has been particularly high priced and difficultly obtainable during periods of war when large quantities are used in the production of munitions. The glycols, mentioned above as useful cellulose softeners, are for the most part obtained by a relatively expensive process of synthesis. The glycols are also relatively volatile and are therefore unsatisfactory for use in softening some types of cellulosic pellicles. For an industry consuming large amounts of these materials, therefore, the development of less expensive equivalents or means for reducing the consumption of expensive materials will mean a marked economy in production.

It is, therefore, an object of this invention to provide a new and useful method for producing softened, water sensitive, cellulosic materials possessing desirable physical properties. It is a further object of this invention to provide water sensitive, cellulosic materials having a softening agent associated therewith, which softening agent will not interfere with any subsequent treatment of the cellulosic pellicles, such as the application of surface coatings, ink, coloring matter, adhesives, or the like. It is a still further object of this invention to provide a rigid, flexible, transparent, durable, cellulosic pellicle, such as a sheet, film, or tube of regenerated cellulose in which the softening agent consists in whole or in part of a water soluble hydrochloric acid addition product of ethanolamine. Other objects of the invention will appear hereinafter.

By the term "rigidity" or its equivalent as used herein is meant that property which is the opposite of limpness; in other words, rigidity in the sense that the pellicle can be advanced in a wrapping machine or similar apparatus without curling, crumpling or otherwise fouling the machine.

The term "durability" is used to define resistance to shock or rough handling. Thus, for example, bags may be fabricated from the pellicle and filled with some standard material such as a certain weight of dried beans, and the package sealed, whereupon the durability may be measured against a known standard by dropping the package under standard conditions and noting the resistance of the wrapper to breakage.

The objects of this invention can be attained, in general, by treating a regenerated cellulose pellicle, or a like water sensitive, cellulosic pellicle with a softening agent comprising a water soluble hydrochloric acid addition product of ethanolamine. As specific examples of such compounds may be mentioned monoethanolamine hydrochloride, diethanolamine hydrochloride and triethanolamine hydrochloride. The excess softening agent is then removed from the pellicle, and the pellicle so treated is dried.

In the manufacture of regenerated cellulose sheets or films, as for example by the viscose process, the cellulosic dispersion is formed into a sheet or film by passing the same through suitable apparatus into coagulating and/or regenerating baths from which it is finally obtained in the form of a continuous cellulosic sheet which is customarily led in a continuous manner through a series of purifying, bleaching and washing operations. Just prior to the drying operation which is also usually continuous, co-ordinating with the sheet forming and purification operations, the film is passed through a bath containing a softening agent in such concentration that after the excess liquid has been removed from the surface of the sheet by suitable squeeze rolls and the excess moisture removed by passage through the drier, the final sheet can be wound up in a continuous fashion and will contain an appropriate predetermined amount of softening agent.

The commercially available dry regenerated cellulose film contains approximately 4% to 8% moisture. Depending upon the particular uses for which the product is destined, the softening agent in the sheet or film, usually glycerol, may vary from about 8% to 25%, based on the combined weight of the cellulose and softening agent in the sheet.

The total amount of softener in the film is controlled primarily by the total amount of softening agent in the treating bath; film thickness, rate of passage through the bath, temperature of the bath, etc., may also contribute thereto to a certain extent. The regenerated cellulose pellicle, when reaching the treating bath, is in a highly swollen and hydrated condition and usually the cellulose of the pellicle is associated with 300% or more of water. This highly swollen and wet pellicle, usually referred to as the gel sheet, is impregnated with the treating bath. Because of the large amount of water associated with the cellulose, it is apparent that the removal of this water during the drying operation will concentrate the softening agent with respect to the cellulose content of the pellicle.

Thus it is that if a regenerated cellulose pellicle containing about 15% total softener is desired as a final product, the concentration of softener in the treating bath will be adjusted to approximately one third that value, or about 5%. This is true when the softening agents are, like glycerol and the improved agents of this invention, substantially non-volatile and are not vaporized during the drying operation. It is obvious that if a mixed softener is used, the components of which are appreciably volatile during the drying operation, then the softener concentration of the treating bath must be increased sufficiently to compensate for the loss thereof during the drying step.

It has now been discovered that salts of the type indicated above are extremely well suited as softening agents for water sensitive, cellulosic pellicles, that is, pellicles produced from aqueous alkaline cellulosic solutions or dispersions coagulated in an acid coagulating bath, especially those of regenerated cellulose, and that they may be used as substitutes for glycerol in this capacity. Furthermore, pellicles of regenerated cellulose softened with the materials of this invention possess desirable properties which are not found in similar pellicles in which the sole flexibilizing and softening agent is glycerol.

The following examples will illustrate the practice of the invention, but it is to be understood that they are in no way limitative of the principles of the invention.

*Example I*

A sheet or film of gel regenerated cellulose, in which the final dry thickness will be about 0.0009 inch, is immersed in or drawn through an aqueous bath containing monoethanolamine hydrochloride in such concentration that the final dried product will contain about 6.3% moisture and 14% of monoethanolamine hydrochloride, based on the combined weight of cellulose and softener in the film. The sheet or film is allowed to remain in contact with the bath until thoroughly impregnated, whereupon it is removed from the bath, the excess liquid drained off or removed by suitable squeeze rolls, blotters or the like, when the film can be dried in the usual manner down to the final moisture content indicated above. When tested at a relative humidity of about 35% at 24° C., or even in relative humidities as low as 15% to 22% at ordinary temperatures, the durability of the film is found to be at least equal to that of a similar regenerated cellulose film softened with about 14% glycerol.

*Example II*

A sheet or continuous film of gel regenerated cellulose such that the final dry thickness will be about 0.0012 inch is treated in the manner described in Example I, using however a treating bath having a composition capable of providing a final film containing about 6.3% moisture, and 18.0% of diethanolamine hydrochloride. In this case, the final product will be equal to or better than a similar regenerated cellulose sheet or film bearing 15% to 16% glycerol alone as softener, insofar as its physical properties are concerned, including transparency and flexibility, under varying conditions.

*Example III*

A sheet or continuous film of gel regenerated cellulose such that the final dry thickness will be about 0.0009 inch is treated in the manner described in Example I, using however a treating bath having a composition capable of providing a final film containing about 6.3% moisture and 17% of triethanolamine hydrochloride. In this case, the final product will be found to have excellent flexibility in addition to good surface characteristics.

*Example IV*

Where a highly flexibilized sheet or film of regenerated cellulose is desired and one in which transparency will not be impaired by the softener present, a mixture of the hydrochloric acid addition product of mono- and triethanolamine may be advantageously used. For instance, the following composition may be applied in the manner described in Example I to a film of gel regenerated cellulose such that the final dried thickness will be about 0.0012 inch:

| | Per cent by weight |
|---|---|
| Monoethanolamine hydrochloride | 3.5 |
| Triethanolamine hydrochloride | 2.5 |
| Water | 94.0 |

The sheet or film of gel regenerated cellulose treated with this bath in accordance with the procedure outlined in Example I will show physical characteristics, substantially equal to or better than those of a similar regenerated cellulose sheet treated with a softener bath containing 5% of glycerol (that is, a final film containing about 15% of glycerol). In spite of the high concentration of the ethanolamine hydrochloride, the film is transparent. It is likewise extremely flexible and durable.

The following example illustrates one method of softening a regenerated cellulose sheet with a mixture of glycerol and a hydrochloric acid addition product of ethanolamine.

Example V

A sheet or continuous film of gel regenerated cellulose similar to that of Example I is treated in the manner described in Example I, using however a treating bath of the following approximate composition:

| | Per cent by weight |
|---|---|
| Glycerol | 2.5 |
| Monoethanolamine hydrochloride | 2.5 |
| Water | 95.0 |

The film obtained will contain total softener in the amount of about 15% based on the combined weight of the cellulose and softener. This film exhibits excellent physical characteristics.

The following example illustrates the method employed when a relatively volatile cellulose softener is admixed with an ethanolamine hydrochloride and compensation is made for loss during the drying operation.

Example VI

A sheet or continuous film of gel regenerated cellulose such that the final dry thickness will be about 0.0009 inch is immersed in or passed through a treating bath of the following approximate composition:

| | Per cent by weight |
|---|---|
| Monoethanolamine hydrochloride | 2.5 |
| Ethylene glycol | 3.1 |
| Water | 94.4 |

In this bath, the ratio of monoethanolamine hydrochloride to ethylene glycol is about 1:1.24. The film is treated as described in Example I and yields a final product containing about 6.3% moisture, 7.5% monoethanolamine hydrochloride, and 7.44% of ethylene glycol. The ratio of monoethanolamine hydrochloride to ethylene glycol in the dried film is thus about 1:1, the amount of ethylene glycol having been decreased by loss during the drying operation. The dried film is subsequently provided with a surface coating which may be of any type desired.

Thus, for example, it may be provided with a moistureproofing coating which may conveniently contain a cellulose derivative, a plasticizer, a resin or blending agent, and a moistureproofing agent, such as a wax or wax-like material. The surface coating in this case serves the double purpose of providing a moistureproof product and of preventing loss by evaporation of the relatively volatile ethylene glycol. Even when tested under such drastic conditions, as described in Example I, the product is transparent, flexible and more durable than a similar film softened with 15% glycerol alone.

Films obtained in the preceding examples are found to possess, in addition to good transparency, flexibility and durability, improved surface characteristics. Moreover, when films softened with the softening agents of this invention are coated with a composition comprising a cellulose derivative, said coatings are found to adhere with tenacity to the base sheet and to withstand the loosening effect of water and high degrees of relative humidity. Furthermore, films softened with materials of the instant invention resist the propagation of flames much more readily than similar films softened with glycerol.

It is obvious that in the above examples the concentration of total softening agent in the treating bath may be suitably varied according to the base being treated in order that the final product will have the appropriate amount of softener.

As a base, the invention contemplates the use of any water sensitive, cellulosic structure, particularly of pellicular nature such as a sheet or film, artificial straw, caps, bands, or continuous tubes, such as may be obtained by the coagulation and/or regeneration from an aqueous cellulosic dispersion in accordance with the procedure customary in the art. Thus, the invention comprehends the use of regenerated cellulose pellicles such as may be obtained from the viscose or cuprammonium processes, as well as pellicles composed of glycol cellulose, cellulose glycollic acid, lowly esterified or lowly etherified cellulose derivatives where there is only one ether or ester group associated with several cellulose units, and other cellulosic structures of similar character.

Similarly, various types of paper, especially of the glassine type, may be used as base materials. As a matter of convenience, the invention has been described in terms of its application to the softening of regenerated cellulose pellicles such as those sheets or films of regenerated cellulose which are suitable for use as wrapping tissue, it being understood that the scope of the invention includes any of the other bases set forth above and that the invention is equally applicable thereto.

All of the examples given have been set forth in terms of a sheet or film of gel regenerated cellulose (gel regenerated cellulose being defined as a water swollen regenerated cellulose which has never been dried; hence that product which is obtained from the wet end of the casting machine). Obviously, this is the more practical way of practicing the invention since the softening agent is customarily incorporated into the sheet or film while the latter is in the gel state and during the normal course of manufacture. Obviously, if one desires to impregnate an already dried regenerated cellulose film with a softener of the character described, it is possible to rewet the dried film so as to render it highly swollen, whereupon it may be treated with treating baths similar to those described, but of composition suitable for obtaining the final product desired. In the same way, any of the sheets set forth as equivalent to regenerated cellulose sheets can be substituted in the specific examples.

The invention has been described in part in terms of the use of glycerol in combination with the softeners of the invention. It is to be understood that other similar known cellulose softeners may be substituted for the glycerol and among those may be mentioned ethylene glycol, diethylene glycol, triethylene glycol, formamide, carbamide, and other substances known to the art as softeners for water sensitive cellulose structures.

It is also to be understood that various mixtures of the newly described softening agents may be employed with single softeners of the prior art or with mixtures of the latter, depending upon the type of final film desired and the purposes for which the film is to be used.

If a colored cellulosic pellicle is desired, it may be obtained in any of the ways commonly known in the art, including the passage of the sheet or film through a bath containing a suitable dyestuff. If desired, the dyestuff may be added to the bath used for introducing the softening agent. In the same way, after the film has been treated with the softening agent, it may be subjected to any of the customary after-treatments such as sizing or coating, or the like, which may be customarily given to cellulosic pellicles of the type described, in just the same manner that a glycerol softened regenerated cellulose film, for example, may be treated.

The instant invention offers numerous advantages over the prior art means of softening cellulosic pellicles of the type described. Since the softening agents of the present invention are substantially solid substances at ordinary temperatures, the control of concentrations used for treating baths is greatly simplified. Because of their crystalline nature, the softening agents are available in highly purified condition and consequently improve the quality of the final product. However, unlike many crystalline compounds, they do not crystallize after incorporation in the sheet in the concentrations useful for softening. They can be obtained synthetically at a very low cost in comparison to the cost of known softeners and they are available in unlimited quantity independent of a by-product source.

The use of the newly described softening agents results in a product having improved physical characteristics, particularly improved transparency, flexibility, durability, surface slip and the like. Furthermore, films softened with the materials of this invention are particularly well suited for coatings especially with compositions comprising cellulose derivatives. Such compositions applied to the surface of these films adhere with tenacity when subjected to water and high relative humidities.

Since it is obvious that many changes and modifications can be made in the above described details without departing from the nature and spirit of the invention, it is to be understood that the invention is not to be limited thereto except as set forth in the following claims.

I claim:
1. A flexible, durable, water sensitive, water insoluble cellulosic structure of the type precipitated from aqueous alkaline cellulosic solutions, said structure containing, as a softener therefor, a water soluble hydrochloric acid addition product of an ethanolamine.

2. A flexible, durable, regenerated cellulose structure, said structure containing, as a softener therefor, a water soluble hydrochloric acid addition product of an ethanolamine.

3. A flexible, durable, water sensitive, water insoluble cellulosic structure of the type precipitated from aqueous alkaline cellulosic solutions, said structure containing, as a softener therefor, monoethanolamine hydrochloride.

4. A flexible, durable, water sensitive cellulosic structure, said structure containing, as a softener therefor, diethanolamine hydrochloride.

5. A flexible, durable, water sensitive, water insoluble cellulosic structure of the type precipitated from aqueous alkaline cellulosic solutions, said structure containing, as a softener therefor, triethanolamine hydrochloride.

6. Regenerated cellulose softened with monoethanolamine hydrochloride.

7. Regenerated cellulose softened with diethanolamine hydrochloride.

8. Regenerated cellulose softened with triethanolamine hydrochloride.

9. Regenerated cellulose softened with 8% to 25% of the hydrochloride of material having the formula:

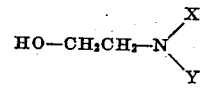

wherein X is a member of the group consisting of hydrogen and —CH$_2$CH$_2$OH and Y is a member of the group consisting of hydrogen and —CH$_2$CH$_2$OH.

FRANKLIN TRAVISS PETERS.